(12) United States Patent
Peuhkurinen et al.

(10) Patent No.: US 12,307,706 B2
(45) Date of Patent: *May 20, 2025

(54) EMPLOYING PATTERNED LIGHT TO DETERMINE RELATIVE POSES

(71) Applicant: Varjo Technologies Oy, Helsinki (FI)

(72) Inventors: Ari Antti Erik Peuhkurinen, Helsinki (FI); Urho Konttori, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 625 days.

This patent is subject to a terminal disclaimer.

(21) Appl. No.: 17/720,517

(22) Filed: Apr. 14, 2022

(65) Prior Publication Data

US 2023/0334691 A1    Oct. 19, 2023

(51) Int. Cl.
| | |
|---|---|
| *G06T 7/73* | (2017.01) |
| *A63F 13/213* | (2014.01) |
| *A63F 13/35* | (2014.01) |
| *A63F 13/65* | (2014.01) |
| *G01B 11/25* | (2006.01) |
| *G06T 7/521* | (2017.01) |
| *G06V 10/60* | (2022.01) |

(52) U.S. Cl.
CPC .............. *G06T 7/73* (2017.01); *A63F 13/213* (2014.09); *A63F 13/35* (2014.09); *A63F 13/65* (2014.09); *G01B 11/2504* (2013.01); *G06T 7/521* (2017.01); *G06V 10/60* (2022.01); *A63F 2300/8082* (2013.01)

(58) Field of Classification Search
CPC ....... G06T 7/73; G06T 7/521; G01B 11/2504; G06V 10/60; A63F 13/35; A63F 2300/8082; A63F 13/65; A63F 13/213
See application file for complete search history.

(56) References Cited

U.S. PATENT DOCUMENTS

| | | | |
|---|---|---|---|
| 10,529,128 B1 * | 1/2020 | Ren | .......................... G01S 17/87 |
| 2016/0073091 A1 | 3/2016 | Hillebrand et al. | |

(Continued)

OTHER PUBLICATIONS

European Patent Office, Extended European Search Report, Application No. 23162002.2, Mailed Sep. 11, 2023, 8 pages.

*Primary Examiner* — Amandeep Saini
*Assistant Examiner* — Daniella M. DiGuglielmo
(74) *Attorney, Agent, or Firm* — Ziegler IP Law Group, LLC.

(57) ABSTRACT

A system includes devices, each including an illuminator, sensor and processor, where the processor of a given device is configured to: project a pattern of light onto surroundings, while detecting reflections of the pattern of light onto the surroundings, determine shapes of surfaces present in the surroundings and distances of the surfaces from a pose of the given device; obtain pattern information indicative of pattern(s) of light projected by other active illuminator(s) of other device(s), detect reflections of pattern(s) from the pose of the given device; determine a relative pose of other device(s) with respect to the pose of the given device; and send, to a server, surface information indicative of the shapes and the distances of the surfaces from the pose of the given device, along with pose information indicative of the relative pose of the other device(s) with respect to the pose of the given device.

30 Claims, 3 Drawing Sheets

(56) References Cited

U.S. PATENT DOCUMENTS

| | | | |
|---|---|---|---|
| 2016/0163054 A1* | 6/2016 | Izadi | H04N 5/33 |
| | | | 348/164 |
| 2020/0265621 A1 | 8/2020 | Santos et al. | |
| 2020/0408913 A1* | 12/2020 | Pompe | G01B 11/002 |
| 2021/0144220 A1* | 5/2021 | Zavesky | G06F 3/011 |

* cited by examiner

EMPLOYING PATTERNED LIGHT TO DETERMINE RELATIVE POSES

TECHNICAL FIELD

The present disclosure relates to systems employing patterned light to determine relative poses. The present disclosure also relates to devices employing patterned light to determine relative poses. The present disclosure also relates to methods employing patterned light to determine relative poses.

BACKGROUND

In recent times, there has been an ever-increasing demand for developing interactive visual content, for example, such as immersive extended-reality (XR) environments, for various fields such as entertainment, real estate, training, medical imaging operations, simulators, navigation, and the like. An XR environment is often created by collecting sensor data (including images) from multiple devices present in a same real-world environment. The sensor data is captured by sensors (for example, such as visible-light cameras, infrared sensors, structured-light sensors or similar) of these devices. In order to create the XR environment, the sensor data is processed based on corresponding poses of the devices from which the sensor data has been collected.

However, existing techniques for creating the XR environments are associated with several limitations. Firstly, pose-tracking is often inaccurate, and therefore, processing sensor data based on inaccurate poses leads to inconsistencies in an XR environment generated therefrom. Secondly, due to inaccurate pose-tracking, it is difficult to synchronise sensors of devices present in the same real-world environment. Thirdly, some existing techniques employ a separate pose-tracking system (for example, such as Valve Corporation's SteamVR® tracking system, an OptiTrack™ tracking system, or similar) for tracking the pose of each device. This considerably increases costs, processing complexities and computing power requirements. Fourthly, some existing techniques employ markers (for example, such as a Quick Response (QR) code) and detectors to determine the pose of each device. This limits usage of such techniques to only those real-world environments where such markers are already pre-installed. Fifthly, other existing techniques employ model fitting on a three-dimensional (3D) model of the real-world environment to track the pose of each device. However, such implementations are cumbersome and error-prone.

Therefore, in light of the foregoing discussion, there exists a need to overcome the aforementioned drawbacks associated with existing techniques for creating the XR environments.

SUMMARY

The present disclosure seeks to provide a system that employs patterned light to determine relative poses. The present disclosure also seeks to provide a device that employs patterned light to determine relative poses. The present disclosure also seeks to provide a method that employs patterned light to determine relative poses. An aim of the present disclosure is to provide a solution that overcomes at least partially the problems encountered in prior art.

In a first aspect, an embodiment of the present disclosure provides a system comprising a plurality of devices, each device comprising an active illuminator, an active sensor and a processor, wherein a processor of a given device is configured to:
control an active illuminator of the given device to project a pattern of light onto surroundings of the given device, whilst controlling an active sensor of the given device to detect reflections of the pattern of light off the surroundings, wherein the reflections are detected from a given pose of the given device;
determine shapes of surfaces present in the surroundings and distances of the surfaces from the given pose of the given device, based on the pattern and its detected reflections;
obtain pattern information indicative of at least one other pattern of light projected onto the surroundings by at least one other active illuminator of at least one other device;
employ the active sensor of the given device to detect reflections of the at least one other pattern of light off the surroundings, wherein the reflections of the at least one other pattern are detected from the given pose of the given device;
determine a relative pose of the at least one other device with respect to the given pose of the given device, based on the shapes and the distances of the surfaces from the given pose of the given device, the at least one other pattern and its detected reflections; and
send, to a server, surface information indicative of the shapes and the distances of the surfaces from the given pose of the given device, along with pose information indicative of the relative pose of the at least one other device with respect to the given pose of the given device.

In a second aspect, an embodiment of the present disclosure provides a device comprising an active illuminator, an active sensor and a processor, wherein the processor is configured to:
control the active illuminator to project a pattern of light onto surroundings of the device, whilst controlling the active sensor to detect reflections of the pattern of light off the surroundings, wherein the reflections are detected from a given pose of the device;
determine shapes of surfaces present in the surroundings and distances of the surfaces from the given pose of the device, based on the pattern and its detected reflections;
obtain pattern information indicative of at least one other pattern of light projected onto the surroundings by at least one other active illuminator of at least one other device;
employ the active sensor to detect reflections of the at least one other pattern of light off the surroundings, wherein the reflections of the at least one other pattern are detected from the given pose of the device;
determine a relative pose of the at least one other device with respect to the given pose of the device, based on the shapes and the distances of the surfaces from the given pose of the device, the at least one other pattern and its detected reflections; and
send, to a server, surface information indicative of the shapes and the distances of the surfaces from the given pose of the device, along with pose information indicative of the relative pose of the at least one other device with respect to the given pose of the device.

In a third aspect, an embodiment of the present disclosure provides a method comprising:
controlling an active illuminator of a device to project a pattern of light onto surroundings of the device, whilst controlling an active sensor of the device to detect reflections of the pattern of light off the surroundings, wherein the reflections are detected from a given pose of the device;

determining shapes of surfaces present in the surroundings and distances of the surfaces from the given pose of the device, based on the pattern and its detected reflections;

obtaining pattern information indicative of at least one other pattern of light projected onto the surroundings by at least one other active illuminator of at least one other device;

employing the active sensor to detect reflections of the at least one other pattern of light off the surroundings, wherein the reflections of the at least one other pattern are detected from the given pose of the device;

determining a relative pose of the at least one other device with respect to the given pose of the device, based on the shapes and the distances of the surfaces from the given pose of the device, the at least one other pattern and its detected reflections; and sending, to a server, surface information indicative of the shapes and the distances of the surfaces from the given pose of the device, along with pose information indicative of the relative pose of the at least one other device with respect to the given pose of the device.

Embodiments of the present disclosure substantially eliminate or at least partially address the aforementioned problems in the prior art, and enable accurate, real time or near-real time determination of relative poses of devices with respect to each other by way of employing patterned light.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising a plurality of devices, each device comprising an active illuminator, an active sensor and a processor, wherein a processor of a given device is configured to:

control an active illuminator of the given device to project a pattern of light onto surroundings of the given device, whilst controlling an active sensor of the given device to detect reflections of the pattern of light off the surroundings, wherein the reflections are detected from a given pose of the given device;

determine shapes of surfaces present in the surroundings and distances of the surfaces from the given pose of the given device, based on the pattern and its detected reflections;

obtain pattern information indicative of at least one other pattern of light projected onto the surroundings by at least one other active illuminator of at least one other device;

employ the active sensor of the given device to detect reflections of the at least one other pattern of light off the surroundings, wherein the reflections of the at least one other pattern are detected from the given pose of the given device;

determine a relative pose of the at least one other device with respect to the given pose of the given device, based on the shapes and the distances of the surfaces from the given pose of the given device, the at least one other pattern and its detected reflections; and send, to a server, surface information indicative of the shapes and the distances of the surfaces from the given pose of the given device, along with pose information indicative of the relative pose of the at least one other device with respect to the given pose of the given device.

In a second aspect, an embodiment of the present disclosure provides a device comprising an active illuminator, an active sensor and a processor, wherein the processor is configured to:

control the active illuminator to project a pattern of light onto surroundings of the device, whilst controlling the active sensor to detect reflections of the pattern of light off the surroundings, wherein the reflections are detected from a given pose of the device;

determine shapes of surfaces present in the surroundings and distances of the surfaces from the given pose of the device, based on the pattern and its detected reflections;

obtain pattern information indicative of at least one other pattern of light projected onto the surroundings by at least one other active illuminator of at least one other device;

employ the active sensor to detect reflections of the at least one other pattern of light off the surroundings, wherein the reflections of the at least one other pattern are detected from the given pose of the device;

determine a relative pose of the at least one other device with respect to the given pose of the device, based on the shapes and the distances of the surfaces from the given pose of the device, the at least one other pattern and its detected reflections; and send, to a server, surface information indicative of the shapes and the distances of the surfaces from the given pose of the device, along with pose information indicative of the relative pose of the at least one other device with respect to the given pose of the device.

In a third aspect, an embodiment of the present disclosure provides a method comprising:

controlling an active illuminator of a device to project a pattern of light onto surroundings of the device, whilst controlling an active sensor of the device to detect reflections of the pattern of light off the surroundings, wherein the reflections are detected from a given pose of the device;

determining shapes of surfaces present in the surroundings and distances of the surfaces from the given pose of the device, based on the pattern and its detected reflections;

obtaining pattern information indicative of at least one other pattern of light projected onto the surroundings by at least one other active illuminator of at least one other device;

employing the active sensor to detect reflections of the at least one other pattern of light off the surroundings, wherein the reflections of the at least one other pattern are detected from the given pose of the device;

determining a relative pose of the at least one other device with respect to the given pose of the device, based on the shapes and the distances of the surfaces from the given pose of the device, the at least one other pattern and its detected reflections; and sending, to a server, surface information indicative of the shapes and the distances of the surfaces from the given pose of the device, along with pose information indicative of the relative pose of the at least one other device with respect to the given pose of the device.

The present disclosure provides the aforementioned system, the aforementioned device, and the aforementioned method that employ patterned light to accurately determine relative poses. Beneficially, this enables in synchronising active sensors (as well as active illuminators) of the plurality of devices, as accurate and real time or near-real time (relative) pose information and surface information are determined by a given device. As a result, collaboration of multiple users using respective ones of the plurality of devices becomes realistic and immersive.

Moreover, the system enables in optionally generating a three-dimensional model of the surroundings by utilizing shapes and distances of surfaces from a pose of the given device, along with relative poses of the other devices with respect to the pose of the given device. Furthermore, there is no need for employing a separate pose-tracking means for tracking pose of each device from amongst the plurality of devices. This considerably reduces costs, processing complexities, and computing power requirements associated with conventional pose-tracking. The device is simple and robust. The method is fast, effective, reliable and can be implemented with ease.

Throughout the present disclosure, the term "surroundings" refers to a real-world environment whereat a given device is present. One or more of the plurality of devices could be arranged at fixed locations within their surroundings. Optionally, in such a case, such devices are stationary in their surroundings. Additionally or alternatively, one or more other of the plurality of devices could be wearable devices being worn by users present in the surroundings. In such a case, the location of such a device changes with a change in a location of its user. Likewise, one or more of the plurality of devices could be arranged on, for example, drones, robots, or similar. As an example, a given device could be arranged on a support structure and is capable of a three-dimensional (3D) rotation (and additionally, capable of a translation motion). The support structure can be moved to any required location in the surroundings.

It will be appreciated that the plurality of devices could comprise different types of devices present in the same surroundings. In an example, the plurality of devices may comprise head-mounted display (HMD) devices, teleport devices, and the like. The term "head-mounted display" refers to a specialized equipment that is configured to present an extended-reality (XR) environment to a user when said HMD device, in operation, is worn by the user on his/her head. The HMD device is implemented, for example, as an XR headset, a pair of XR glasses, and the like, that is operable to display a visual scene of the XR environment to the user. The term "extended-reality" encompasses virtual reality (VR), augmented reality (AR), mixed reality (MR), and the like. The term "teleport device" refers to a device which facilitates virtual teleportation between the given device and one or more other devices.

Throughout the present disclosure, the term "active illuminator" refers to an equipment that, in operation, projects (namely, emits) the pattern of light onto objects present in the surroundings. A given active illuminator may be an IR illuminator, a visible-light illuminator, a hyperspectral illuminator, or similar. Optionally, the given active illuminator comprises a plurality of light-emitting elements. A given light-emitting element could be a light-emitting diode (LED), a projector, a display, a laser, or similar. The laser may be a vertical-cavity surface-emitting laser (VCSEL), an edge-emitting laser (EEL), or the like. The term "given active illuminator" encompasses the active illuminator and/or the at least one other active illuminator. It will be appreciated that a given device may comprise one or more active illuminators and one or more active sensors. Also, a single device may comprise different types of active illuminators and active sensors.

In some implementations, the pattern of light is a structured-light pattern. Such a structured-light pattern could be a binary-coded structured-light pattern, a grey-coded structured-light pattern, a colour-coded structured-light pattern, or similar. It will be appreciated that the structured-light pattern could be a binary light pattern, a ternary light pattern, a k-ary light pattern, and the like. The technical benefit of employing the structured-light pattern is that it facilitates in generating accurate and precise depth information with a minimal projection time (namely, scanning time) as no marker shape deducing is required. The depth information generated by employing the structured-light pattern could be millimetre accurate.

In other implementations, the pattern of light comprises a plurality of light spots. In this regard, a density of the plurality of light spots (namely, light dots) could vary spatially across the pattern of light. It will be appreciated that having multiple light spots (i.e., the plurality of light spots) in the pattern facilitates in accurately determining the shapes of the surfaces and the distances of the surfaces from the given pose of the given device. This is because the plurality of light spots enable in accurately identifying a surface geometry, determining tangent representation, and backtracking to the active illuminator. Higher the density and the complexity of the pattern of light, higher is the accuracy in determining the shapes of the surfaces and the distances of the surfaces from the given pose of the given device, and vice versa. The pattern of light comprising two light spots could be a simplest type of the pattern. The pattern of light may also comprise a single light spot. Optionally, a shape of the pattern of light is one of: circular, elliptical, polygonal, a freeform shape. Moreover, the shape of the light spots could be one of: circular, elliptical, polygonal, a freeform shape.

Optionally, a given pattern of light is formed by at least two light beams forming at least one angle therebetween. Optionally, the at least one angle is equal to or greater than 1 degree. As an example, the at least one angle may be 1 degree, 2 degrees, 3 degrees, 5 degrees, 10 degrees, and the like. This allows a size of the given pattern of light to vary with a distance of a given surface (or its portion) onto which the given pattern of light is projected from a given active illuminator. In other words, the size of the given pattern changes (i.e., decreases or increases) when the distance of the given surface from the given active illuminator changes. Beneficially, such a variation in the size of the given pattern facilitates in accurately determining a distance of the given surface from the given pose of the given device. Greater the distance of the given surface from the given active illuminator, greater is the size of the given pattern, and vice versa. The term "given pattern of light" encompasses the pattern of light projected from the active illuminator and/or the at least one other pattern of light projected from the at least one other active illuminator.

It will be appreciated that sizes of light spots of the given pattern may change (i.e., the light spots may enlarge or diminish), in addition to the change in the size of the given pattern. Alternatively, the size of light spots may remain the same. In such a case, the size of the given pattern of light may change with the distance of the given surface from the given active illuminator, but the sizes of the light spots of the given pattern remain the same (i.e., the light spots do not enlarge or diminish). A given light spot may be produced by employing at least one of: a collimating element (such as a collimating lens, a collimating mirror, and similar), a colour filter, a polarizer, a light absorbing element, a beam modulator.

Moreover, optionally, a given pattern of light projected by a given active illuminator is a marker whose field area changes with a distance of a surface onto which the marker is projected from the given active illuminator. In this regard, the field area of the marker (namely, a two dimensional (2D) area occupied by the marker) changes (i.e., decreases or increases) when the distance of the surface from the given active illuminator changes. Greater the distance of the given surface from the given active illuminator, greater is the field area of the marker, and vice versa. The technical benefit of employing the marker as the given pattern of light is that the marker is easily and accurately detectable by the active sensor even at varying distances of the surface from the given active illuminator. Examples of the marker include, but are not limited to, a Quick Response (QR) code, an ArUco marker, an anchor marker, a Radio Frequency Identification (RFID) marker, a barcode marker, a Just Another Bar (JAB) code marker. It will be appreciated that a type of active sensor to be employed for detecting the marker is selected based on a type of the marker.

Throughout the present disclosure, the term "active sensor" refers to an equipment that is operable to detect reflections of a given pattern of light off the surroundings (or particularly, the surfaces or their portions present in the surroundings). Optionally, a given active sensor may be implemented as at least one of: a camera, an infrared (IR) transceiver, an RFID reader, a barcode reader. Optionally, the camera is implemented as at least one of: an infrared (IR)-light camera, a Red-Green-Blue-Depth (RGB-D) camera, a Light Detection and Ranging (LiDAR) camera, a Time-of-Flight (ToF) camera, a Sound Navigation and Ranging (SONAR) camera, a structured-light camera, a hyperspectral-light camera. The ToF camera could be a direct-type ToF camera or an indirect-type ToF camera.

Optionally, when the active sensor is implemented as the camera, the camera is controlled (by the processor) to process the reflections of the given pattern of light off the surroundings, so as to capture an image of the reflections. It will be appreciated that said image of the reflections may be captured from a perspective of the given pose of the given device. Examples of the camera include, but are not limited to, a Red-Green-Blue (RGB) camera, a Red-Green-Blue-Alpha (RGB-A) camera, a monochrome camera, a Red-Green-Blue-Depth (RGB-D) camera, a stereo camera, a Time-of-Flight (ToF) camera, an IR camera, a ranging camera, a Light Detection and Ranging (LiDAR) camera, a flash LiDAR camera, a Sound Navigation and Ranging (SONAR) camera, a laser rangefinder, a plenoptic camera.

Notably, the processor controls overall operation of the given device. The processor is communicably coupled to the active illuminator and the active sensor, wirelessly and/or in a wired manner.

A manner in which the pattern of light deforms upon striking the surfaces or their portions present in the surroundings allows for determining the shapes of the surfaces or their portions and the distances of the surfaces or their portions from the given pose of the given device. The pattern of light is deformed according to the shapes of the surfaces. The shape of a given surface could be cylindrical, spherical, conical, polygonal, freeform shape, and the like. The aforesaid deformation may also depend on a surface geometry of the given surface and/or a surface texture of the given surface. The surface geometry of the given surface could be planar (namely, flat), curved, freeform, or similar.

Optionally, the (captured) image of the reflections is compared with a reference image of the pattern of light to determine the shapes of the surfaces and the distances of the surfaces from the given pose of the given device. In such a case, said image and the reference image are compared to determine a local transverse shift of light spots of said pattern, and such a local transverse shift is used to determine the aforesaid shapes and distances. The aforesaid shapes and distances could be also determined using a triangulation technique.

The at least one other device is present in the surroundings of the given device. In some implementations, the given device is communicably coupled to the at least one other device, and the pattern information is obtained by the given device from the at least one other device. In other implementations, the server is communicably coupled to the plurality of devices, and is configured to receive, from each device, information indicative of a respective pattern of light being projected by a respective active illuminator of each device. In such implementations, the pattern information is obtained by the given device from the server. The pattern information is required by the given device to know what type of the at least one other pattern of light is being projected by the at least one other active illuminator of the at least one other device.

Furthermore, the reflections of the at least one other pattern of light are detected by the active sensor of the given device from only those surfaces (or their portions) in the surroundings that are in fields of view of both the given device and the at least one other device. The reflections of the at least one other pattern are detected from the same pose (namely, the given pose) from which the active sensor detects the reflections of the pattern of light. Beneficially, this facilitates in accurately determining overlapping projection surfaces in the surroundings and 3D surface information of the surroundings.

As an example, the surroundings may comprise six surfaces S1, S2, S3, S4, S5, and S6. Herein, the active illuminator of the given device may project the pattern onto the surfaces S1, S2, and S3, and the at least one other active illuminator of the at least one other device may project the at least one other pattern onto the surfaces S1, S3, S4, S5, and S6. In such a case, the active sensor of the given device detects reflections of the pattern off the surfaces S1, S2, and S3, and detects reflections of the at least one other pattern off the surfaces S1 and S3.

Optionally, the processor of the given device is configured to:
  detect when the pattern projected by the active illuminator of the given device is same as the at least one other pattern projected by the at least one other active illuminator of the at least one other device; and
  change the pattern to be projected by the active illuminator of the given device.

Since the pattern information is already and accurately known to the processor, the at least one other pattern (projected by the at least one other active illuminator) can be easily recognized by the processor to be a unique pattern being projected by the at least one other active illuminator when the reflections of the at least one other pattern are detected. In this regard, the processor compares the at least one other pattern with the pattern projected by the active illuminator for detecting whether the two aforesaid patterns are the same. When the two aforesaid patterns are the same, the processor changes the pattern to be projected by the active illuminator of the given device. It will be appreciated that changing the pattern to be projected by the active illuminator enables the active sensor to differentiate between different patterns and their reflections as detected in the surroundings. Thus, the reflections of the pattern (projected by the active illuminator) and the reflections of the at least one other pattern are easily differentiated and highly accurately detected. Optionally, when changing the pattern to be projected by the active illuminator of the given device, the processor is configured to employ a set of N patterns from which a given pattern is selected as the pattern to be projected by the active illuminator. Such a selection could be performed in a random manner (i.e., arbitrary selection), or in a predefined manner. As an example, the selection can be made in a cyclic manner from the set of N patterns (that is, by selecting a next pattern while cycling through a list of N patterns in the set).

Moreover, optionally, the active illuminator of the given device and the at least one other active illuminator of the at least one other device employ different frequencies of light. In this regard, a frequency of light employed by the active illuminator to generate the pattern of light is different from a frequency of light employed by the at least one other active illuminator to generate the at least one other pattern of light. This enables the active sensor (of the given device) to highly accurately detect and distinguish between the reflections of the pattern of light and the reflections of the at least one other pattern of light, because the aforesaid patterns and their reflections could be easily differentiated by the active sensor. Additionally or alternatively, optionally, the active illuminator of the given device and the at least one other active illuminator of the at least one other device employ different wavelengths of light. It will be appreciated that the processor is configured to employ a beam modulator for producing light with different frequencies and/or different wavelengths. The beam modulator may modulate a frequency and/or a wavelength of the light to produce one of: visible light, IR light, near-IR light. It will be appreciated that the pattern information is indicative of the frequency of light and/or the wavelength of light employed by the at least one other active illuminator of the at least one other device.

Furthermore, optionally, the processor of the given device is configured to switch off the active illuminator of the given device when the reflections of the at least one other pattern are detected. This improves visibility of the reflections of the at least one other pattern considerably. Beneficially, this enables the active sensor to easily and highly accurately detect the reflections of the at least one other pattern without any interference.

Optionally, the active illuminator of the given device is switched off for a predefined time period when the reflections of the at least one other pattern are detected. In this regard, the active illuminator of the given device is only temporarily switched off by the processor when the reflections of the at least one other pattern are detected. Optionally, the predefined time period is fixed. In such a case, the processor of the given device is configured to switch off the active illuminator only for a fixed duration of time. When the predefined time period is over, the processor is configured to switch on the active illuminator again. Optionally, the predefined time period lies in a range of 48 milliseconds to 1000 milliseconds (i.e., 1 second). As an example, the predefined time period may be from 48, 80 or 100 milliseconds up to 80, 100, 250, 500 or 1000 milliseconds. More optionally, the predefined time period lies in a range of 48 milliseconds to 96 milliseconds. In an example, when a framerate at which active sensors of two devices (present in the same surroundings) are to sense reflections is 60 Hertz, the active sensors of the two devices may alternately sense reflections of light in individual time slots of approximately 16 milliseconds each. In such a case, a processor of one of the two devices is configured to switch off its active illuminator, for example, for approximately 48 milliseconds or more. Alternatively, optionally, the predefined time period is variable. In this regard, the predefined time period may depend on a number of different patterns of light that the active sensor of the given device detects in the surroundings. The number of different patterns of light that the active sensor of the given device detects indicates a number of other devices that are active (namely, present) in the surroundings of the given device. Greater the number of different patterns of light that the given device detects, greater is the predefined time period. The predefined time period may be either system defined, or user defined.

The relative pose of the at least one other device with respect to the given pose of the given device is indicative of an offset between a pose of the given device and a pose of the at least one other device. As the shapes and the distances of the surfaces are accurately known, it is possible to determine the relative pose of the at least one other device based on how the at least one other pattern deformed upon striking the surfaces. Notably, the reflections of the at least one other pattern is representative of how the at least one other pattern deformed. The aforesaid offset (namely, the relative pose) could be determined by backtracking light rays of the reflections of the at least one other pattern to the at least one other active illuminator (namely, an origin of the at least one other pattern) of the at least one other device.

The processor and the server are communicably coupled to each other, optionally via a communication network. Optionally, the system further comprises the server. It will be appreciated that the surface information could be in a form of at least one of: an RGB image, an RGB-D, a depth image. Optionally, the processor is configured to process the surface information to obtain a point cloud or a surflet cloud representing the surface information with or without colour information; and send said point cloud or said surflet cloud to the server. Alternatively, optionally, the processor is configured to send the surface information to the server, and the server is configured to process the surface information to obtain the point cloud or the surflet cloud. The surface information and the pose information are subsequently utilized by the server for generating a 3D model of the surroundings.

Optionally, the pose information is further indicative of a unique identifier of the at least one other device. It will be appreciated that when two or more other devices are present in the surroundings, such unique identifiers are required to distinguish between the two or more other devices. Optionally, the unique identifier is a string of at least one: alphabets, numerals, special characters, symbols.

Optionally, the server is configured to send instructions to the given device and the at least one other device to control active illuminators and active sensors of the given device and the at least one other device to operate by employing multiplexing. It will be appreciated that such a multiplexing facilitates in interleaving the active illuminators and the active sensors of the given device and the at least one other device in a manner that said active illuminators and said active sensors are well-synchronized with each other, and thus do not interfere with each other. In other words, devices whose active sensors are likely to interfere with each other are subsequently controlled to operate by employing the multiplexing. It will also be appreciated that a type of multiplexing to be employed is selected (by the server) based on a type of an active illuminator and an active sensor.

Optionally, the multiplexing comprises at least one of: time-division multiplexing, wavelength-division multiplexing, space-division multiplexing. The term "time-division multiplexing" refers to a time-based interleaving of the active illuminators and the active sensors, wherein a given active illuminator projects a given pattern of light in a given time slot and/or at a given framerate only, and a given active sensor senses reflections of the pattern in a given time slot and/or at a given framerate only. Furthermore, the term "wavelength-division multiplexing" refers to a wavelength-based interleaving of the active illuminators and the active sensors, wherein a given active illuminator has a capability to employ different wavelengths of light, and a given active sensor has a capability to sense different wavelengths of light. Moreover, the term "space-division multiplexing" refers to a space-based interleaving of the active illuminators and the active sensors, wherein a given active illuminator has a capability to control an area of a field of view onto which it projects a pattern of light, and a given active sensor has a capability to control an area of a field of view from where it senses the reflections of the pattern of light.

Optionally, the instructions comprise at least one of:
time slots in which an active illuminator of a given device is to project a pattern of light,
time slots in which an active sensor of the given device is to sense reflections of the pattern of light,
a framerate at which the active illuminator of the given device is to project the pattern of light,
a framerate at which the active sensor of the given device is to sense the reflections of the pattern,
a wavelength of light to be projected by the active illuminator of the given device,
a wavelength of the light to be sensed by the active sensor of the given device,
a pattern of the light to be projected by the active illuminator of the given device,
a pattern of the light to be sensed by the active sensor of the given device,
an area of a field of view on which the active illuminator of the given device is to project the pattern of light,
an area of a field of view from where the active sensor is to sense the reflections of the pattern of light.

The term "time slot" refers to a time duration (namely, time period) in which the active illuminator is to project the pattern of light, or to a time duration in which the active sensor is to sense the reflections of the pattern of light. A given time slot comprises a start time and an end time. Further, the term "framerate" refers to a rate of at which the active illuminator of the given device is to project the pattern of light (per unit time), or to a rate at which the active sensor of the given device is to sense the reflections of the pattern (per unit time). It will be appreciated that, for the active illuminator of the given device that is actively illuminating a same region of the surroundings, time slots and framerates would be same for projecting the pattern of light and for sensing the reflections of the pattern of light. Optionally, a number of time slots lies in a range of 2 to 32. As an example, the number of time slots may be from 2, 3, 5, 10 or 15 up to 10, 16, 24 or 32. Optionally, a given framerate lies in a range of 5 Hertz to 120 Hertz. As an example, the given framerate may be from 5, 10, 15, 30, 50 or 70 Hertz up to 45, 70, 95 or 120 Hertz.

In an example, two devices X1 and X2 may be present in the same surroundings such that active sensors of the two devices X1 and X2 are to alternately sense reflections of the light in individual time slots of 16 milliseconds each, starting from the active sensor of the device X1 at a time instant T. Herein, in a time slot from T to T+16 milliseconds, the active sensor of the device X1 would sense the reflections; in a time slot from T+16 milliseconds to T+32 milliseconds, the active sensor of the device X2 would sense the reflections; in a time slot from T+32 milliseconds to T+48 milliseconds, the active sensor of the device X1 would sense the reflections; in a time slot from T+48 milliseconds to T+64 milliseconds, the active sensor of the device X2 would sense the reflections; and so on. Framerates at which the active sensor of the devices X1 and X2 are to sense the reflections may be 60 Hertz.

It will be appreciated that the wavelength of light to be employed by the active illuminator of the given device and the wavelength of light to be sensed by the active sensor of the given device would be same. The wavelength of the light may be one of: a wavelength of an IR light, a wavelength of an ultraviolet (UV) light, a wavelength of a visible light.

For a given device, the area of the field of view (on which the active illuminator of the given device is to project the pattern of light, or from where the active sensor is to sense the reflections of the pattern) could be one of: a circular area, an elliptical area, a polygonal area, a freeform area. For example, the area of the field of view may be a rectangular area (for example, defined using position coordinates from (x0,y0) to (x2,y2)). The area of the field of view could also be defined in a form of an arbitrary per-pixel mask.

Furthermore, optionally, the server is configured to:
collect, from each device, respective surface information indicative of shapes and distances of the surfaces from a pose of said device, along with respective pose information indicative of relative poses of other devices with respect to the pose of said device; and
process the respective surface information, based on the respective pose information, to generate a three-dimensional model of the surroundings.

Since the relative poses of the other devices (from which the other devices also collected the surface information of the surroundings) are already and accurately known to the server, the server stitches the surface information together to generate the three-dimensional (3D) model of the surroundings. Herein, the term "three-dimensional model" of the surroundings refers to a data structure that comprises comprehensive information pertaining to a 3D space of the surroundings. Such a comprehensive information is indicative of at least one of: surfaces or their portions present in the surroundings, a plurality of features of objects or their portions present in the surroundings, shapes and sizes of the objects or their portions, poses of the objects or their portions, materials of the objects or their portions, colours of objects or their portions, active illuminators, lighting conditions within the surroundings. The object could be a living object (for example, such as a human, a pet, a plant, and the like) or a non-living object (for example, such as a wall, a window, a toy, a poster, a lamp, and the like). Optionally, the 3D model is in a form of at least one of: a 3D polygonal mesh, a 3D point cloud, a 3D surface cloud, a 3D surflet cloud, a voxel-based model, a mathematical 3D surface model, a parametric model, a 3D grid, a 3D hierarchical grid, a bounding volume hierarchy. The 3D polygonal mesh could be a 3D triangular mesh, a 3D quadrilateral mesh, and the like. The mathematical 3D surface model may be based on a plane, a sphere, a cylinder, a box, or similar. For example, the mathematical 3D surface model may be a Non-uniform rational basis spline (NURBS) model.

Optionally, the server is configured to store the 3D model at a data repository, wherein the data repository is communicably coupled to the server. The data repository may be implemented as a memory of the server, a cloud-based database, or similar.

Optionally, when processing the respective surface information to generate the 3D model of the surroundings, the server is configured to employ at least one data stitching technique. As the relative poses of the other devices are already and accurately known to the server, the at least one data stitching technique enables the server to determine a plurality of features that are common in the respective surface information, and to align the respective surface information accordingly, and to stitch (i.e., merge) the respective surface information together for generating the 3D model. This facilitates in accurately and precisely generating the 3D model. When aligning the respective surface information, the at least one data stitching technique may enable the at least one server to warp (namely, re-project) the respective surface information to a same coordinate system, and to perform at least one filtering operation on the respective surface information. The at least one filtering operation could be at least one of: a straight-pass filtering operation, a voxel-based filtering operation, a statistical filtering operation, a conditional filtering operation, a radius filtering operation. The at least one filtering operation may comprise one or more steps, for example, such as averaging, minimum filtering, maximum filtering, median filtering, denoising (for example, by using a moving least squares (MLS) method), and the like. It will be appreciated that upon performing such filtering operations, the respective surface information would be accurate and precise for subsequent merging. Upon merging the respective surface information, data points of the respective surface information may be uniformly re-sampled, for example, using a voxel down-sampling function of a point cloud library (PCL) software. This may beneficially relieve (i.e., remove) duplicated or overdensified data points. A resultant point cloud of a merged surface information may be sub-sampled and filtered to reduce a level of noise, for example by utilizing octree sub-divisions.

Optionally, the at least one data stitching technique comprises at least one feature extraction algorithm. Examples of the at least one feature extraction algorithm include, but are not limited to, an edge-detection algorithm (for example, such as a biased Sobel gradient estimator, a Canny edge active sensor, Deriche edge active sensor, and the like), a corner-detection algorithm (for example, such as Harris & Stephens corner active sensor, Shi-Tomasi corner active sensor, Features from Accelerated Segment Test (FAST) corner active sensor, and the like), a feature descriptor algorithm (for example, such as Binary Robust Independent Elementary Features (BRIEF), Gradient Location and Orientation Histogram (GLOH), and the like), and a feature active sensor algorithm (for example, such as Scale-Invariant Feature Transform (SIFT), Oriented FAST and rotated BRIEF (ORB), Speeded Up Robust Features (SURF), and the like).

Optionally, at least one of the plurality of devices comprises pose-tracking means, wherein a processor of the at least one of the plurality of devices is configured to:
process pose-tracking data, collected by the pose-tracking means, to determine a pose of the at least one of the plurality of devices in a local coordinate space of the at least one of the plurality of devices; and
send, to the server, information indicative of the pose of the at least one of the plurality of devices.

Herein, the term "pose-tracking means" refers to a specialized equipment that is employed to detect and/or follow poses of the at least one of the plurality of devices. The term "pose" encompasses both position and orientation. The pose-tracking means may employ an outside-in tracking technique, an inside-out tracking technique, or a combination of both the aforesaid techniques, for collecting the pose-tracking data. Such techniques are well-known in the art. The pose-tracking means could be implemented as at least one of: an optics-based tracking system (which utilizes, for example, infrared beacons and detectors, infrared cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU), a Global Positioning System (GPS) tracking system. Optionally, the pose-tracking means is implemented as at least one processor that is configured to determine the pose of the at least one of the plurality of devices using a simultaneous localization and mapping (SLAM) technique.

Optionally, the processor employs at least one data processing algorithm to process the pose-tracking data. The pose-tracking data may be in form of images, IMU/TIMU values, motion sensor data values, magnetic field strength values, or similar. Correspondingly, requisite data processing algorithm(s) is/are employed to process the pose-tracking data, to determine the pose of the at least one of the plurality of devices in the local coordinate space. Examples of the at least one data processing algorithm include a feature detection algorithm, an environment mapping algorithm, a pose data extrapolation algorithm, and the like. Furthermore, the term "local coordinate space" refers to a 3D space of the surroundings that is represented by a local coordinate system. The local coordinate system defines a position within the 3D space of the surroundings. Optionally, the local coordinate system has a predefined origin and three mutually perpendicular coordinate axes. The three mutually perpendicular coordinate axes could be, for example, X, Y, and Z axes. Optionally, in this regard, the position in the local coordinate system is expressed as (x, y, z) position coordinates along the X, Y and Z axes, respectively.

It will be appreciated that provided the relative poses of other devices and the pose of the at least one of the plurality of devices, the server can easily and accurately determine the poses of the other devices in the same coordinate space. Optionally, when determining the poses of the other devices, the server is configured to employ at least one mathematical technique. Such a mathematical technique may be based on coordinate geometry.

The present disclosure also relates to the device as described above. Various embodiments and variants disclosed above, with respect to the aforementioned first aspect, apply mutatis mutandis to the device.

Optionally, the server is configured to:
collect, from the device and the at least one other device, respective surface information indicative of shapes and distances of the surfaces from a pose of a respective device, along with respective pose information indicative of relative poses of other devices with respect to the pose of the respective device; and
process the respective surface information, based on the respective pose information, to generate a three-dimensional model of the surroundings.

Optionally, the device comprises pose-tracking means, and wherein the processor is configured to:
process pose-tracking data, collected by the pose-tracking means, to determine a pose of the device in a local coordinate space of the device; and
send, to the server, information indicative of the pose of the device.

Optionally, the pose information is further indicative of a unique identifier of the at least one other device.

Optionally, in the device, the processor is configured to:
detect when the pattern projected by the active illuminator of the device is same as the at least one other pattern projected by the at least one other active illuminator of the at least one other device; and
change the pattern to be projected by the active illuminator of the device.

Optionally, the active illuminator of the device and the at least one other active illuminator of the at least one other device employ different frequencies of light.

Optionally, in the device, the processor is configured to switch off the active illuminator when the reflections of the at least one other pattern are detected.

Optionally, in the device, the active illuminator is switched off for a predefined time period when the reflections of the at least one other pattern are detected.

Optionally, a given pattern of light is formed by at least two light beams forming at least one angle therebetween.

Optionally, a given pattern of light projected by a given active illuminator is a marker whose field area changes with a distance of a surface onto which the marker is projected from the given active illuminator.

The present disclosure also relates to the method as described above. Various embodiments and variants disclosed above, with respect to the aforementioned first aspect, apply mutatis mutandis to the method.

Optionally, the method further comprises:
collecting, at the server from the device and the at least one other device, respective surface information indicative of shapes and distances of the surfaces from a pose of a respective device, along with respective pose information indicative of relative poses of other devices with respect to the pose of the respective device; and
processing, at the server, the respective surface information, based on the respective pose information, to generate a three-dimensional model of the surroundings.

Optionally, the method further comprises:
processing pose-tracking data, collected by pose-tracking means of the device, to determine a pose of the device in a local coordinate space of the device; and
sending, to the server, information indicative of the pose of the device.

Optionally, in the method, the pose information is further indicative of a unique identifier of the at least one other device.

Optionally, the method further comprises:
detecting when the pattern projected by the active illuminator of the device is same as the at least one other pattern projected by the at least one other active illuminator of the at least one other device; and
changing the pattern to be projected by the active illuminator of the device.

Optionally, in the method, the active illuminator of the device and the at least one other active illuminator of the at least one other device employ different frequencies of light.

Optionally, the method further comprises switching off the active illuminator when the reflections of the at least one other pattern are detected.

Optionally, in the method, the active illuminator is switched off for a predefined time period when the reflections of the at least one other pattern are detected.

Optionally, in the method, a given pattern of light is formed by at least two light beams forming at least one angle therebetween.

Optionally, in the method, a given pattern of light projected by a given active illuminator is a marker whose field area changes with a distance of a surface onto which the marker is projected from the given active illuminator.

Optionally, the method further comprises controlling active illuminators and active sensors of the given device and the at least one other device to operate by employing multiplexing.

DETAILED DESCRIPTION OF THE DRAWINGS

Figure 1A:
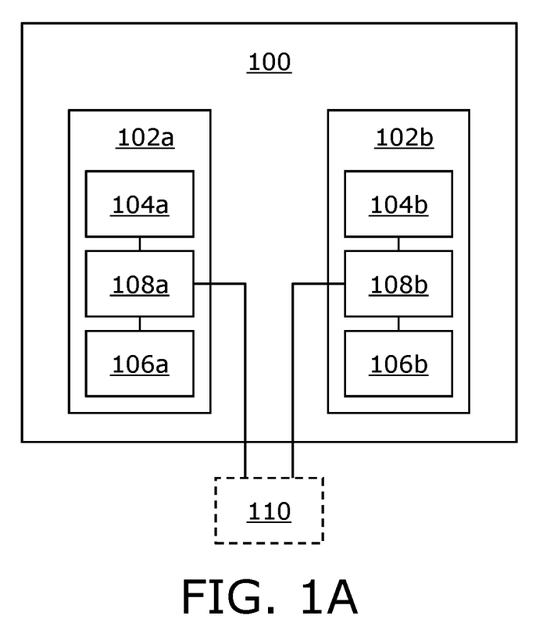
FIGS. 1A and 1B illustrate block diagrams of architectures of a system that employs patterned light to determine relative poses, in accordance with different embodiments of the present disclosure.
Figure 1B:
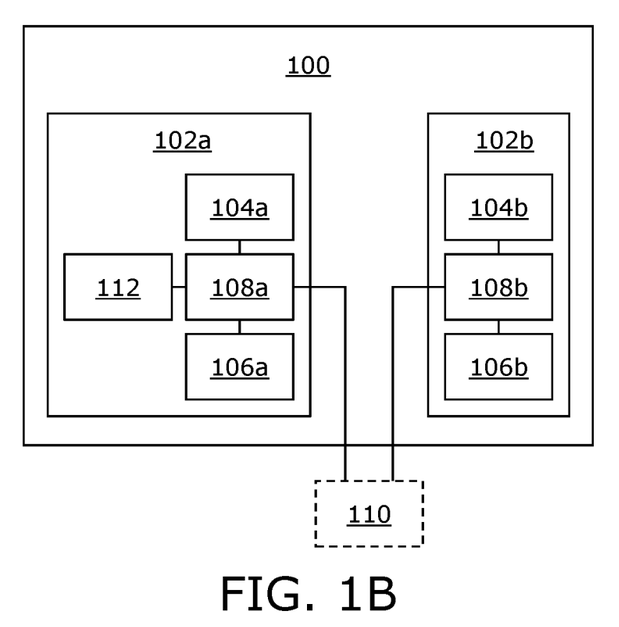

Referring to FIGS. 1A and 1B, illustrated are block diagrams of architectures of a system 100 employing patterned light to determine relative poses, in accordance with different embodiments of the present disclosure. The system 100 comprises a plurality of devices (depicted as devices 102a and 102b). The device 102a comprises an active illuminator 104a, an active sensor 106a, and a processor 108a. The processor 108a is communicably coupled to the active illuminator 104a and the active sensor 106a. The device 102b comprises an active illuminator 104b, an active sensor 106b, and a processor 108b. The processor 108b is communicably coupled to the active illuminator 104b and the active sensor 106b. The processors 108a and 108b are communicably coupled to a server 110. In one implementation, the server 110 is a part of the system 100. In other implementation, the server 110 is not a part of the system 100; such an implementation is depicted in FIGS. 1A and 1B. In FIG. 1B, the device 102a optionally further comprises pose-tracking means 112, wherein the pose-tracking means 112 is communicably coupled to the processor 108a. In an example, the device 102a may be a given device, and the device 102b may be at least one other device.

It may be understood by a person skilled in the art that the FIGS. 1A and 1B include simplified architectures of the system 100 for sake of clarity, which should not unduly limit the scope of the claims herein. It is to be understood that the specific implementations of the system 100 are provided as examples and are not to be construed as limiting it to specific numbers or types of devices and to specific numbers or types of active illuminators and active sensors in the devices. The person skilled in the art will recognize many variations, alternatives, and modifications of embodiments of the present disclosure.

Figure 2:
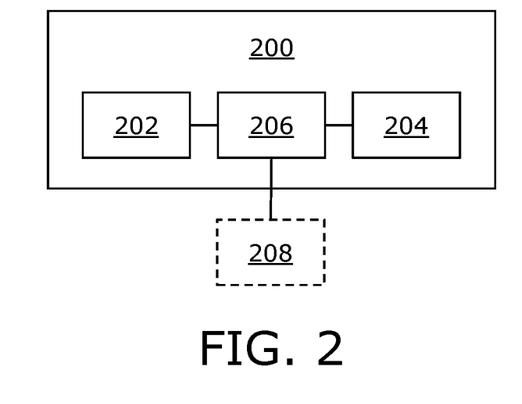
FIG. 2 illustrates a block diagram of architecture of a device that employs patterned light to determine relative poses, in accordance with an embodiment of the present disclosure.

Referring to FIG. 2, illustrated is a block diagram of architecture of a device 200 employing patterned light to determine relative poses, in accordance with an embodiment of the present disclosure. The device 200 comprises an active illuminator 202, an active sensor 204, and a processor 206. The processor 206 is communicably coupled to the active illuminator 202, the active sensor 204, and a server 208.

It may be understood by a person skilled in the art that the FIG. 2 includes a simplified architecture of the device 200 for sake of clarity, which should not unduly limit the scope of the claims herein. It is to be understood that the specific implementation of the device 200 is provided as an example and is not to be construed as limiting it to specific numbers or types of active illuminators and active sensors. The person skilled in the art will recognize many variations, alternatives, and modifications of embodiments of the present disclosure. For example, the device 200 may comprise more than one active illuminator and more than one active sensor. Additionally, the device 200 may comprise pose-tracking means (not shown).

Figure 3:
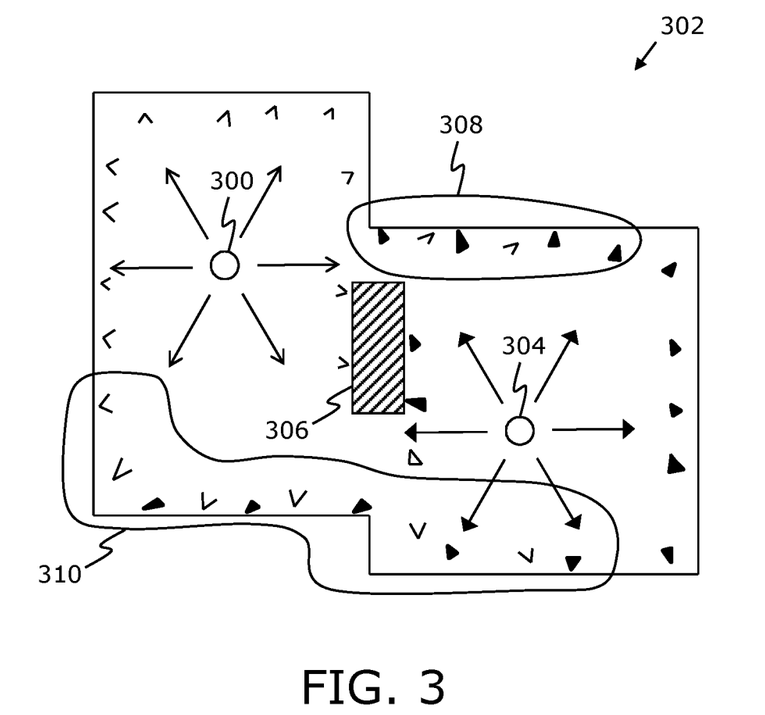
FIG. 3 illustrates an exemplary scenario of using a system that employs patterned light to determine relative poses, in accordance with an embodiment of the present disclosure.

Referring to FIG. 3, illustrated is an example scenario in which a system employing patterned light to determine relative poses could be employed, in accordance with an embodiment of the present disclosure. Herein, a first device 300 is shown to be present in a left-side region of surroundings 302 and a second device 304 is shown to be present in a right-side region of the surroundings 302. The left-side region and the right-side region are partly separated by a barrier 306 present in the surroundings 302. An active illuminator (not shown) of the first device 300 projects a first pattern of light (comprising several 'V' shape light spots as shown) onto the surroundings 302. An active illuminator (not shown) of the second device 304 projects a second pattern of light (comprising several solid triangle shape light spots as shown) onto the surroundings 302. Said projections of light are depicted by way of different arrows originating from the active illuminators of the first device 300 and the second device 304, for the sake of clarity. An active sensor (not shown) of the first device 300 detects reflections of the first pattern of light off the surroundings 302 from a pose of the first device 300. A processor (not shown) of the first device 300 determines shapes of surfaces present in surroundings 302 and distances of the surfaces from the pose of the first device 300, based on the first pattern and its detected reflections. Furthermore, the active sensor of the first device 300 also detects reflections of the second pattern of light off the surroundings 302 (as depicted in marked regions 308 and 310 of the surroundings 302). The processor of the first device 300 determines a relative pose of the second device 304 with respect to the pose of the first device 300, based on the shapes and the distances of the surfaces from the pose of the first device 300, the second pattern and its detected reflections. In an example, the first device 300 may be a given device, and the second device 304 may be at least one other device.

FIG. 3 is merely an example, which should not unduly limit the scope of the claims herein. The person skilled in the art will recognize many variations, alternatives, and modifications of embodiments of the present disclosure.

Figure 4:
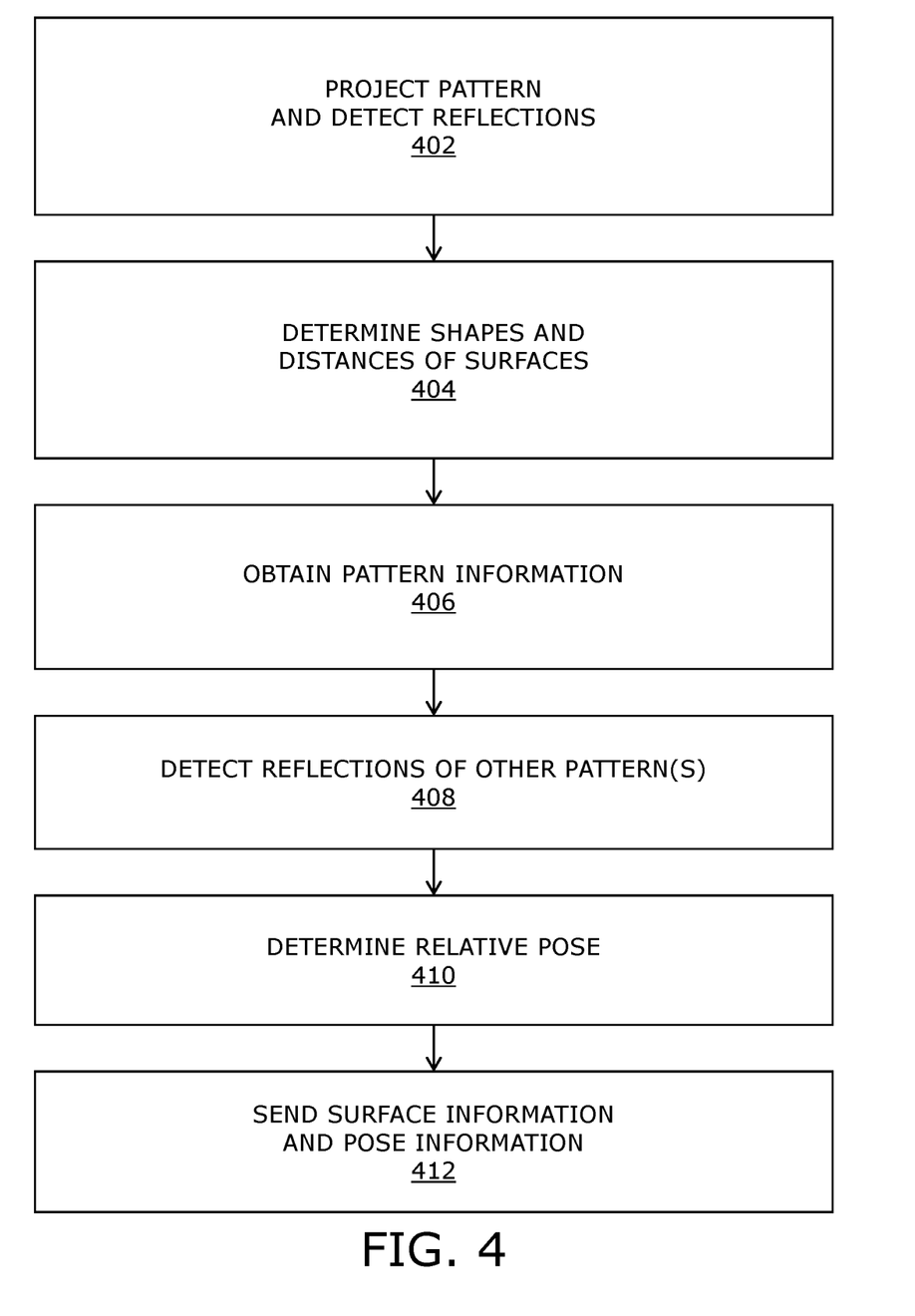
FIG. 4 illustrates steps of a method that employs patterned light to determine relative poses, in accordance with an embodiment of the present disclosure.

Referring to FIG. 4, illustrated are steps of a method employing patterned light to determine relative poses, in accordance with an embodiment of the present disclosure. At step 402, an active illuminator of a device is controlled to project a pattern of light onto surroundings of the device, whilst an active sensor of the device is controlled to detect reflections of the pattern of light off the surroundings, wherein the reflections are detected from a given pose of the device. At step 404, shapes of surfaces present in the surroundings and distances of the surfaces from the given pose of the device are determined, based on the pattern and its detected reflections. At step 406, pattern information indicative of at least one other pattern of light projected onto the surroundings is obtained by at least one other active illuminator of at least one other device. At step 408, the active sensor is employed to detect reflections of the at least one other pattern of light off the surroundings, wherein the reflections of the at least one other pattern are detected from the given pose of the device. At step 410, a relative pose of the at least one other device with respect to the given pose of the device is determined, based on the shapes and the distances of the surfaces from the given pose of the device, the at least one other pattern and its detected reflections. At step 412, surface information indicative of the shapes and the distances of the surfaces from the given pose of the device, along with pose information indicative of the relative pose of the at least one other device with respect to the given pose of the device are sent to a server.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system comprising a plurality of devices, each device comprising an active illuminator, an active sensor and a processor, wherein a processor of a given device is configured to:
control an active illuminator of the given device to project a pattern of light onto surroundings of the given device, whilst controlling an active sensor of the given device to detect reflections of the pattern of light off the surroundings, wherein the reflections are detected from a given pose of the given device;
determine shapes of surfaces present in the surroundings and distances of the surfaces from the given pose of the given device, based on the pattern and its detected reflections;
obtain pattern information indicative of at least one other pattern of light projected onto the surroundings by at least one other active illuminator of at least one other device;
employ the active sensor of the given device to detect reflections of the at least one other pattern of light off the surroundings, wherein the reflections of the at least one other pattern are detected from the given pose of the given device;
determine a relative pose of the at least one other device with respect to the given pose of the given device, based on the shapes of the surfaces present in the surroundings and the distances of the surfaces from the given pose of the given device, the at least one other pattern and its detected reflections; and
send, to a server, surface information indicative of the shapes of the surfaces present in the surroundings and the distances of the surfaces from the given pose of the given device, along with pose information indicative of the relative pose of the at least one other device with respect to the given pose of the given device.

2. The system of claim 1, wherein the server is configured to:
collect, from each device, respective surface information indicative of the shapes of the surfaces present in the surroundings and the distances of the surfaces from a pose of each device, along with respective pose information indicative of relative poses of other devices with respect to the given pose of the given device; and
process the respective surface information, based on the respective pose information, to generate a three-dimensional model of the surroundings.

3. The system of claim 1, wherein at least one of the plurality of devices comprises pose-tracking means, wherein a processor of the at least one of the plurality of devices is configured to:
process pose-tracking data, collected by the pose-tracking means, to determine a pose of the at least one of the plurality of devices in a local coordinate space of the at least one of the plurality of devices; and
send, to the server, information indicative of the pose of the at least one of the plurality of devices.

4. The system of claim 1, wherein the pose information is further indicative of a unique identifier of the at least one other device.

5. The system of claim 1, wherein the processor of the given device is configured to:
detect when the pattern projected by the active illuminator of the given device is the same as the at least one other pattern projected by the at least one other active illuminator of the at least one other device; and
change the pattern to be projected by the active illuminator of the given device.

6. The system of claim 1, wherein the active illuminator of the given device and the at least one other active illuminator of the at least one other device employ different frequencies of light.

7. The system of claim 1, wherein the processor of the given device is configured to switch off the active illuminator of the given device when the reflections of the at least one other pattern are detected.

8. The system of claim 7, wherein the active illuminator of the given device is switched off for a predefined time period when the reflections of the at least one other pattern are detected.

9. The system of claim 1, wherein a given pattern of light is formed by at least two light beams forming at least one angle therebetween.

10. The system of claim 1, wherein a given pattern of light projected by a given active illuminator is a marker whose field area changes with a distance of a surface onto which the marker is projected from the given active illuminator.

11. A device comprising an active illuminator, an active sensor and a processor, wherein the processor is configured to:
control the active illuminator to project a pattern of light onto surroundings of the device, whilst controlling the active sensor to detect reflections of the pattern of light off the surroundings, wherein the reflections are detected from a given pose of the device;
determine shapes of surfaces present in the surroundings and distances of the surfaces from the given pose of the device, based on the pattern and its detected reflections;
obtain pattern information indicative of at least one other pattern of light projected onto the surroundings by at least one other active illuminator of at least one other device;
employ the active sensor to detect reflections of the at least one other pattern of light off the surroundings, wherein the reflections of the at least one other pattern are detected from the given pose of the device;
determine a relative pose of the at least one other device with respect to the given pose of the device, based on the shapes of the surfaces present in the surroundings and the distances of the surfaces from the given pose of the device, the at least one other pattern and its detected reflections; and
send, to a server, surface information indicative of the shapes of the surfaces present in the surroundings and the distances of the surfaces from the given pose of the device, along with pose information indicative of the relative pose of the at least one other device with respect to the given pose of the device.

12. The device of claim 11, wherein the server is configured to:
collect, from the device and the at least one other device, respective surface information indicative of the shapes of the surfaces present in the surroundings and the distances of the surfaces from a pose of a respective device, along with respective pose information indicative of relative poses of other devices with respect to the pose of the respective device; and process the respective surface information, based on the respective pose information, to generate a three-dimensional model of the surroundings.

13. The device of claim 11, wherein the device comprises pose-tracking means, and wherein the processor is configured to:
process pose-tracking data, collected by the pose-tracking means, to determine a pose of the device in a local coordinate space of the device; and
send, to the server, information indicative of the pose of the device.

14. The device of claim 11, wherein the pose information is further indicative of a unique identifier of the at least one other device.

15. The device of claim 11, wherein the processor is configured to:
detect when the pattern projected by the active illuminator of the device is the same as the at least one other pattern projected by the at least one other active illuminator of the at least one other device; and
change the pattern to be projected by the active illuminator of the device.

16. The device of claim 11, wherein the active illuminator of the device and the at least one other active illuminator of the at least one other device employ different frequencies of light.

17. The device of claim 11, wherein the processor is configured to switch off the active illuminator when the reflections of the at least one other pattern are detected.

18. The device of claim 17, wherein the active illuminator is switched off for a predefined time period when the reflections of the at least one other pattern are detected.

19. The device of claim 11, wherein a given pattern of light is formed by at least two light beams forming at least one angle therebetween.

20. The device of claim 11, wherein a given pattern of light projected by a given active illuminator is a marker whose field area changes with a distance of a surface onto which the marker is projected from the given active illuminator.

21. A method comprising:
controlling an active illuminator of a device to project a pattern of light onto surroundings of the device, whilst controlling an active sensor of the device to detect reflections of the pattern of light off the surroundings, wherein the reflections are detected from a given pose of the device;
determining shapes of surfaces present in the surroundings and distances of the surfaces from the given pose of the device, based on the pattern and its detected reflections;
obtaining pattern information indicative of at least one other pattern of light projected onto the surroundings by at least one other active illuminator of at least one other device;
employing the active sensor to detect reflections of the at least one other pattern of light off the surroundings, wherein the reflections of the at least one other pattern are detected from the given pose of the device;
determining a relative pose of the at least one other device with respect to the given pose of the device, based on the shapes of the surfaces present in the surroundings and the distances of the surfaces from the given pose of the device, the at least one other pattern and its detected reflections; and
sending, to a server, surface information indicative of the shapes of the surfaces present in the surroundings and the distances of the surfaces from the given pose of the device, along with pose information indicative of the relative pose of the at least one other device with respect to the given pose of the device.

22. The method of claim 21, further comprising:
collecting, at the server from the device and the at least one other device, respective surface information indicative of the shapes of the surfaces present in the surroundings and the distances of the surfaces from a pose of a respective device, along with respective pose information indicative of relative poses of other devices with respect to the pose of the respective device; and
processing, at the server, the respective surface information, based on the respective pose information, to generate a three-dimensional model of the surroundings.

23. The method of claim 21, further comprising:
processing pose-tracking data, collected by pose-tracking means of the device, to determine a pose of the device in a local coordinate space of the device; and
sending, to the server, information indicative of the pose of the device.

24. The method of claim 21, wherein the pose information is further indicative of a unique identifier of the at least one other device.

25. The method of claim 21, further comprising:
detecting when the pattern projected by the active illuminator of the device is the same as the at least one other pattern projected by the at least one other active illuminator of the at least one other device; and
changing the pattern to be projected by the active illuminator of the device.

26. The method of claim 21, wherein the active illuminator of the device and the at least one other active illuminator of the at least one other device employ different frequencies of light.

27. The method of claim 21, further comprising switching off the active illuminator when the reflections of the at least one other pattern are detected.

28. The method of claim 27, wherein the active illuminator is switched off for a predefined time period when the reflections of the at least one other pattern are detected.

29. The method of claim 21, wherein a given pattern of light is formed by at least two light beams forming at least one angle therebetween.

30. The method of claim 21, wherein a given pattern of light projected by a given active illuminator is a marker whose field area changes with a distance of a surface onto which the marker is projected from the given active illuminator.

* * * * *